United States Patent [19]

Caron

[11] 3,866,172

[45] Feb. 11, 1975

[54] COMMUNICATION SYSTEM FOR TRANSMITTING DATA WORDS PRIOR TO RECEIPT OF ACKNOWLEDGMENTS FOR PREVIOUSLY TRANSMITTED DATA WORDS

[75] Inventor: Lionel Caron, Holmdel, N.J.

[73] Assignee: Bell Telephone Laboratories, Incorporated, Murray Hill, N.J.

[22] Filed: May 16, 1974

[21] Appl. No.: 470,409

[52] U.S. Cl. .......................... 340/147 R, 340/163 R

[51] Int. Cl. .............................................. H04q 9/00

[58] Field of Search ............. 340/146.1, 147 R, 163, 340/152 R, 151 R

[56] References Cited

UNITED STATES PATENTS

| | | | |
|---|---|---|---|
| 3,135,945 | 6/1964 | Swanson | 340/146.1 |
| 3,253,259 | 5/1966 | Jacoby | 340/147 R |
| 3,456,239 | 7/1969 | Glasson | 340/146.1 |

*Primary Examiner*—Harold I. Pitts
*Attorney, Agent, or Firm*—D. E. Nester

[57] ABSTRACT

A system is disclosed for transmitting data words from a base location to a remote location prior to receipt of acknowledgment signals from the remote location acknowledging that previously transmitted data words have been received. A bit in each transmitted data word designates the data word as belonging to one of two classes —arbitrarily designated "even" and "odd." Each time an even data word is transmitted an "even" flip-flop is set, and each time an odd data word is transmitted an "odd" flip-flop is set. Each acknowledgment signal transmitted from the remote location to the base location indicates whether an odd or even word has been received thereat. Each of these acknowledgment signals is utilized at the base location to reset the flip-flop associated with the respective odd or even class acknowledged. Even and odd data words are alternately transmitted, but transmission of new words of each class is inhibited as long as the flip-flop associated with that class is set indicating that the previously transmitted word of that class has not been acknowledged.

12 Claims, 6 Drawing Figures

COMMUNICATION SYSTEM FOR TRANSMITTING DATA WORDS PRIOR TO RECEIPT OF ACKNOWLEDGMENTS FOR PREVIOUSLY TRANSMITTED DATA WORDS

FIELD OF THE INVENTION

This invention pertains to communication transmission systems and, more particularly, to systems for transmitting data words between two remotely situated processing entities. Even more particularly, this invention pertains to systems for transmitting data words to remote apparatus prior to receipt of acknowledgment signals from the remote apparatus acknowledging that all previously transmitted data words have been received.

BACKGROUND OF THE INVENTION AND PRIOR ART

The high quality transmission network in this country has made it economically and technologically feasible for remote processing units to communicate over fairly substantial distances. As these distances increase it remains vitally important to maintain the integrity of data transmitted between the processing units. This is particularly important in systems, such as the telephone network, where a high degree of real-time coordination and cooperation is essential between units.

One arrangement used in the past to ensure the integrity of data transmission between two processing units required the receiving unit to send the transmitting unit an acknowledgment for each data word received by the receiving unit. Moreover, the transmitting unit would not transmit the next data word until an acknowledgment was received for the previously transmitted data word. This arrangement was very effective in coordinating the flow of data between the processing units and also provided high transmission reliability.

However this prior arrangement suffered from the disadvantage that the transmitting unit had to wait to receive an acknowledgment from the receiving unit before transmitting the next data word. This wait or time delay comprised (1) the time required for signals to propagate from the transmitting unit to the receiving unit (2) the time required for the receiving unit to generate and transmit an acknowledgment word, and (3) the time required for the acknowledgment signal to propagate from the receiving unit to the transmitting unit.

As the distance between units increases, the propagation time for signal transmission in each direction increased proportionately in accordance with the speed of light. Actually, signals propagate somewhat slower than the speed of light in part due to the delays induced by repeaters and carrier systems. Thus, as the distance between units increases, the time also increases between the transmission of a data word and the reception of an acknowledgment signal therefor. This tends to limit the frequency at which data words can be transmitted.

Moreover, in recent years the cycle time of processing units has decreased substantially allowing a consequential increase in processing capacity. As cycle time continues to decrease, the above-described propagation delays become more and more significant and tend to adversely affect the processing by the units. In systems in which a processing unit is capable of transmitting data words at a frequency which is greater than the acknowledgment delay time, it is apparent that requiring a transmitting unit to wait for an acknowledgment before transmitting the next data word seriously impedes the transmission of data words between processing units. For example, in a system in which a processing unit is capable of transmitting a data word every 25 ms, and in which 40 ms is required to receive an acknowledgment, it is apparent that the system would be adversely limited to transmitting a data word every 40 ms.

It is an object of this invention to transmit data words at time intervals which are smaller than those time intervals in which acknowledgments are normally received.

It is a further object of this invention to provide a communication system in which data words can be transmitted to a remote location prior to receipt of acknowledgment signals from the remote location acknowledging that previously transmitted data words have been received.

SUMMARY OF THE INVENTION

In accordance with this invention, data words are transmitted to a remote location prior to receipt of signals from the remote location acknowledging that previously transmitted data words have been received. Each transmitted data word contains a designation of the class to which that data word belongs and each acknowledgment from the remote location defines the class of a received data word. When a data word is transmitted, an indication is stored in a memory specifying the class of the transmitted data word; and when an acknowledgment is received, the indication of the class defined by the acknowledgment is cleared from the memory. While an indication for a class is stored in memory, the transmission of other data words of that class is inhibited. Data words are transmitted in a sequence wherein consecutive data words are of different classes allowing a data word of one class to be transmitted while the system awaits receipt of an acknowledgment for the preceeding transmitted data word of another class.

More specifically in accordance with this one illustrative embodiment of my invention, a bit in each data word transmitted designates the data word as belonging to one of two classes —arbitrarily designated even and odd. Each time an even word is transmitted an even flip-flop is set; and each time an odd word is transmitted an odd flip-flop is set. Each acknowledgment signal from the remote location indicates whether an odd or even word has been received thereat. Each of these acknowledgment signals is utilized to reset the flip-flop associated with the respective odd or even class acknowledged. Even and odd data words are alternately transmitted, but transmission of new words of each class is inhibited while the flip-flop associated with that class is set.

Thus, for example, an even data word can be transmitted although an acknowledgment for the odd data word transmitted immediately therebefore has not yet been received, but another odd data word cannot be transmitted until an acknowledgment is received for the last transmitted odd data word.

In accordance with a feature of this invention, each transmitted data word contains a designation of the class to which that data word belongs and each acknowledgment word defines the class of a received data word.

In accordance with another feature of my invention, memory means are provided for storing a class indication specifying the class of each transmitted data word, and this class indication is cleared from the memory means when an acknowledgment word is received defining this particular class.

In accordance with still another feature of my invention, a plurality of data words of a plurality of different classes is transmitted in a sequence wherein consecutive data words are of different classes, allowing a word of one class to be transmitted while the system awaits the receipt of an acknowledgment for a previously transmitted word of another class.

In accordance with still another feature of my invention, a data word of one class can be transmitted even though the acknowledgment for the previously transmitted word of another class has been received, although generally such an acknowledgment would not be received until after the data word of that one class was transmitted.

BRIEF DESCRIPTION OF THE DRAWING

The foregoing as well as other objects, features, and advantages of my invention will be more apparent from a description of the drawing, in which:

FIG. 2 illustrates the local transmitter shown in FIG. 1;

FIG. 3 illustrates the local receiver shown in FIG. 1;

FIG. 4 illustrates the remote receiver shown in FIG. 1;

FIG. 5 illustrates the remote transmitter shown in FIG. 1;

GENERAL DESCRIPTION

Figure 1:
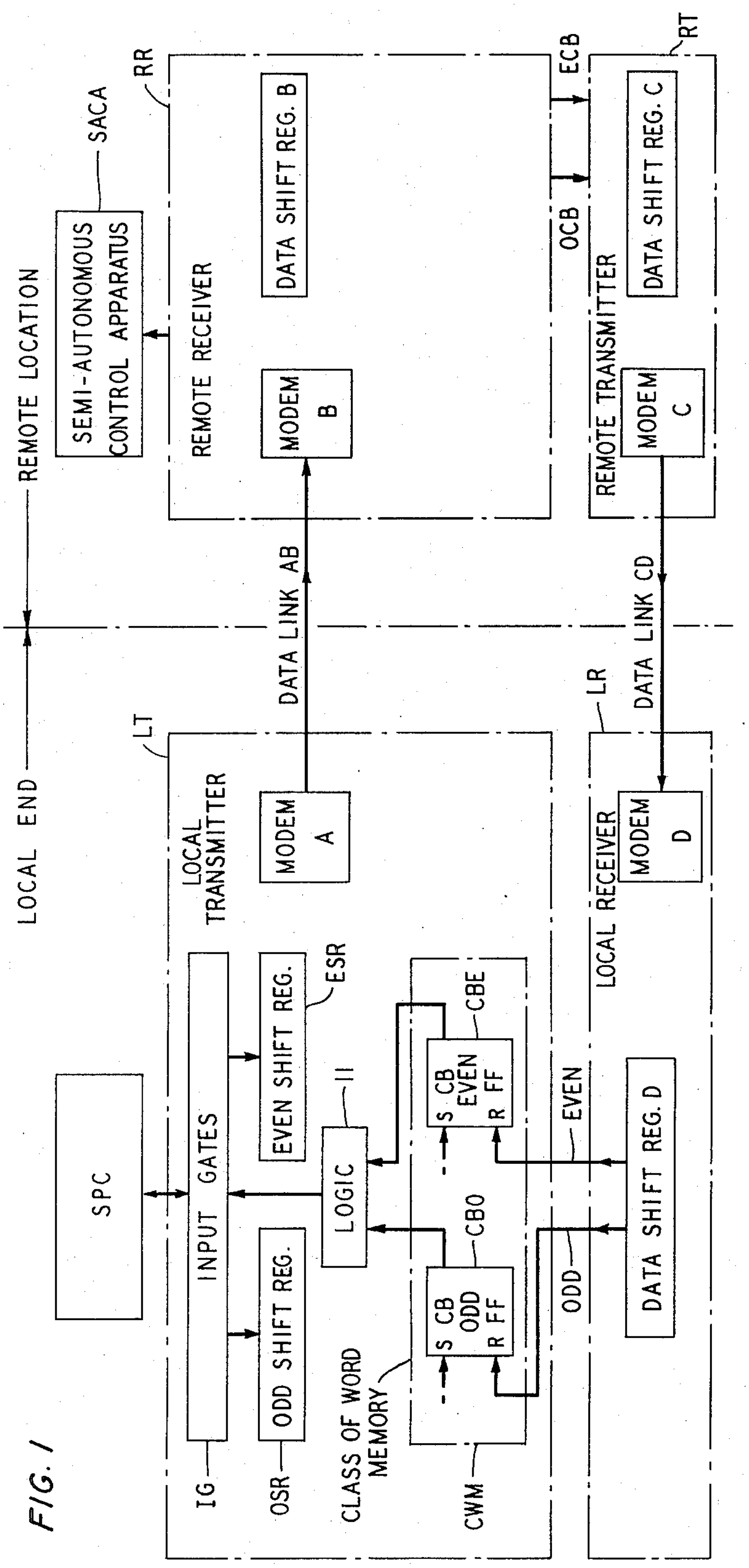
FIG. 1 is a block diagram illustrating one environment in which my invention may be utilized and some of the elements of this illustrative embodiment of my invention in a conceptualized format.

FIG. 1 shows a very general conceptualized version of this illustrative embodiment of my invention. Not all the communication paths between the depicted elements are shown, but this figure will serve as a vehicle for introducing some of the main elements of this embodiment of my invention. These elements will be fully described hereinafter in regard to FIGS. 2–5.

The primary purpose of the circuitry depicted in FIG. 1 is to provide communication between stored program control SPC and semiautonomous control apparatus SACA. This communication is in the form of data words each comprising 27 bits which are serially transmitted from local transmitter LT to remote receiver RR over data link AB.

Stored program control SPC is a data processing unit for performing logical and arithmetic operations on data in accordance with its stored program. In one embodiment, SPC controls the communication between various telephone trunk circuits and operator positions so that the operators can communicate to the calling subscribers the charges required to call a desired destination. The structure, operation and software of the SPC are described in Vol. 49, of the December 1970 issue of *Bell System Technical Journal*, on pages 2417 to 2729. The utilization of the SPC for serving customer dialed telephone calls is further disclosed in R. J. Jaeger Jr. et al. U.S. Pat. No. 3,484,560, issued Dec. 16, 1969.

Semiautonomous control apparatus SACA may correspond to the switching controller and other circuitry utilized to control a concentrator switch and a group of remote trunks which are geographically separated by a substantial distance from the SPC. Such an arrangement is disclosed by A. E. Joel, Jr. U.S. Pat. No. 3,731,000, issued May 1, 1973.

It should be understood that my invention pertains to the communication of data words between any two processing entities and is not limited for use in a telephone system utilizing the component systems previously identified.

Returning now to FIG. 1, every 25 ms the SPC supplies a data word to local transmitter LT to be transmitted to remote receiver RR over data link AB for use by SACA. When remote receiver RR receives the data word, it so informs remote transmitter RT which generates an acknowledgment word which is transmitted back to local receiver LR via data link CD. The acknowledgment word when received by local receiver LR indicates to local transmitter LT that the transmitted data word had been acknowledged. Although data words can be transmitted every 25 ms, it sometimes requires up to 40 ms from the time a data word is transmitted until an acknowledgment is received. If the local transmitter had to wait for an acknowledgment before transmitting the next data word, the operation of the system would be impaired. However, in accordance with this illustrative embodiment of my invention as described hereinafter, data words can be transmitted every 25 ms although acknowledgment word reception requires up to 40 ms. It should be noted that the time for reception of acknowledgments can vary considerably due to buffering of messages and other maintenance considerations. In some circumstances, it is anticipated that some acknowledgments will be received in less than 25 ms while other acknowledgments will require up to 40 ms.

With each data word the SPC also provides an indication whether this word is an odd word or an even word. If an odd word is indicated and if the previously transmitted odd word was acknowledged, input gates IG convey the word into odd shift register OSR. A bit is then inserted in the data word to designate the word as odd. Similarly if an even word is indicated and if the previously transmitted even word was acknowledged, the data word is conveyed into even shift register ESG. A bit is then inserted in the data word to designate the word as even.

To facilitate an understanding of this embodiment of my invention, we will assume that an odd word is indicated and the previously transmitted odd word was acknowledged. Input gates IG load the word from the SPC into odd shift register OSR, where under the control of timing apparatus (not shown), it is applied to modem A for transmission over data link AB to modem B in remote receiver RR. At this time an odd class indication is stored in class of word memory CWM by setting checkback-odd-flip-flop CBO to indicate that an odd data word has been transmitted. In this illustrative embodiment, class of word memory CWM comprises flip-flips CBO and CBE which serve to store class indications. Other types of storage elements could also be used to store these class indications.

Modems A, B, C, and D are well known data sets which first modulate digital information into a signal suitable for transmission over a data link and then demodulate the transmitted signal into the original digital information. For example, modem A modulates the serially received digital information from odd shift register OSR into a sine wave which is transmitted over data link to modem B. Modem B then demodulates the sine wave into the original digital information applied from register OSR. Timing apparatus (not shown) conveys the transmitted odd data word to data register B. This odd data word is acted upon by semiautonomous control apparatus SACA in accordance with its programmed function.

The bit in the data word in register B which designates it as an odd word is used to generate a signal to remote transmitter RT over lead OCB. If the data word were even, a signal would be generated over lead ECB to remote transmitter RT. Apparatus (not shown) in the remote transmitter RT is responsive to the signal received over lead OCB for generating an acknowledgment word which indicates that an odd word was received at the remote location. This acknowledgment word is conveyed to modem C under the control of timing apparatus (not shown) and transmitted over data link CD to modem D and finally loaded into data shift register D by other timing apparatus which is not depicted. Since this acknowledgment word specifies that an odd data word was received, the checkback-odd-flip-flop CBO in memory CWM in local transmitter LT is reset to clear the odd class indication, and the last odd transmitted data word is cleared from register OSR. As previously discussed, this odd flip-flop was set when the odd data word was transmitted by local transmitter LT. If an even acknowledgment word had been received then even flip-flop CBE in memory CWM would have been reset to clear the even class indication and the contents of even shift register ESG cleared.

If the transmission of another odd word had been attempted after the odd data word was transmitted but before the odd acknowledgment was received, logic 11 responsive to the set state of checkback-odd-flip-flop CBO would have inhibited the loading of another odd word from the SPC into shift register OSR, and the last transmitted odd word in register OSR (which was not cleared) would be retransmitted.

Thus FIG. 1 depicts a system in which each time an odd word is transmitted, an odd class indication is stored in memory CWM by setting checkback-odd-flip-flop CBO, and each time an even word is transmitted, an even class indication is stored in memory CWM by setting checkback-even-flip-flop CBE. When an acknowledgment is received from the remote location specifying that an odd word was received, the odd class indication in memory CWM is cleared by resetting the flip-flop CBO, and when an acknowledgment is received specifying that an even word was received, the even class indication is cleared by resetting flip-flop CBE. As long as flip-flop CBO is set (i.e., an odd class indication is stored in memory CWM), new odd words cannot be loaded into the odd shift register OSR. As long as flip-flop CBE is set (i.e., an even class indication is stored in memory), new even words cannot be loaded into even shift register ESR.

Even words and odd words are alternately transmitted so that a new odd word can be transmitted while the local receiver LR awaits the reception of an acknowledgment for the even word previously transmitted therebefore and similarly the next even word can be transmitted while local receiver LR awaits the reception of an acknowledgment signal for the odd word previously transmitted therebefore.

Thus, data words can be transmitted at a 25 ms rate even though acknowledgments require up to 40 ms. For example, if an odd data word is transmitted, and then an even data word is transmitted 25 ms later, the next odd data word can be transmitted 25 ms after the even word if the acknowledgment for the first odd word was received. This acknowledgment should have been received by 15 ms after the even word was transmitted—i.e., 40 ms after the first odd word was transmitted. Thus this arrangement beneficially allows data words to be transmitted to a remote location prior to the receiving acknowledgment words from the remote location acknowledging that all previously transmitted data words have been received. As a consequence of this, data words can be transmitted efficiently between the SPC and the semiautonomous control apparatus SACA.

Moreover, even if an acknowledgment word for the last transmitted data word is received before the next data word is transmitted (i.e., acknowledgment word is received within less than 25 ms), the next data word can still be properly transmitted. Thus my invention is adapted to operate in an environment in which the expected reception time for individual acknowledgment words can vary considerably.

DETAILED DESCRIPTION

In order to facilitate the complete understanding of this preferred illustrative embodiment of my invention, I will describe in detail how data words are transmitted from the SPC to the SACA at the remote location and properly acknowledged.

Figure 2:
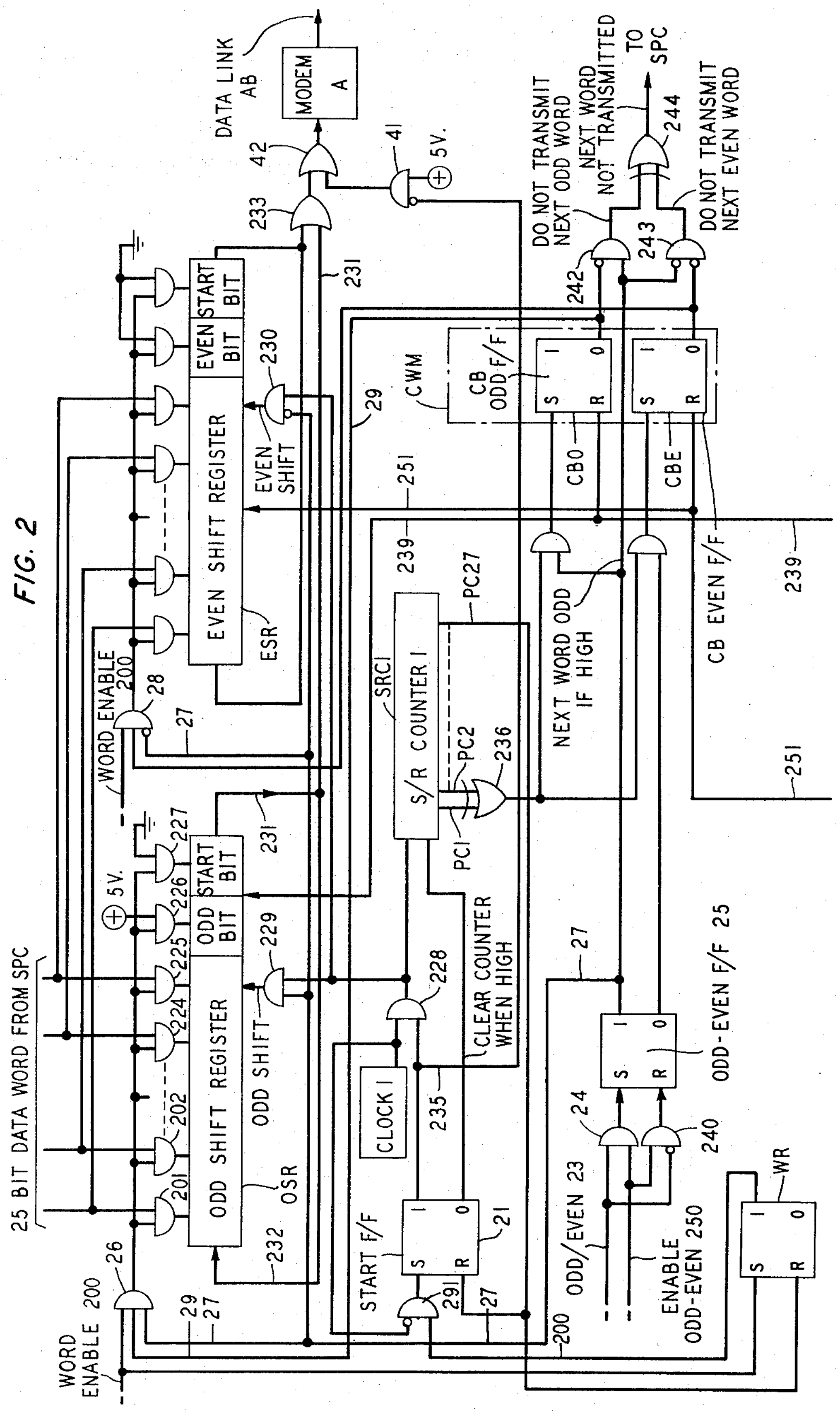
FIGS. 2 through 5 when arranged as shown in FIG. 6 illustrate the structure of an illustrative embodiment of my invention. More specifically.

Turning now to FIGS. 2 through 5 it will be assumed that initially all shift registers and counters contain Os and initially all flip-flops are reset. In this so-called quiescent state, both inputs to AND gate 41 in FIG. 2 are HIGH. The lower input is HIGH because positive 5 volts are continuously applied thereto. Because start flip-flop 21 in FIG. 2 is reset, its 1 output is LOW which output is inverted at the upper input lead to gate 41. Each small open circle in the drawing at an input lead to a gate or flip-flop represents that the signal on the input lead is inverted prior to its application to the gate or flip-flop. Thus, the signal on the upper lead of gate 41 is always inverted and then applied to the gate. The output of gate 41 is HIGH and OR gate 42 continually applies a HIGH signal to modem A. Modem A responsive to this HIGH input transmits a continuous serial stream of binary 1s as a modulated sine wave to modem B. In this illustrative embodiment, it is anticipated that data link AB may be several hundred miles long, and that signals transmitted by modem A will not be received by modem B for several milliseconds. Modem B demodulates the sine waves and generates therefrom a continuous serial stream of binary 1s which are applied to lead 43. Since these bits are all 1s, the start bit detector flip-flop 44 is not set and the data is not gated into data shift register B via AND gate 45. Thus in the quiescent state no data other than a stream of 1s is transmitted from the local transmitter LT shown in FIG. 2 to the remote receiver RR shown in FIG. 4.

To transmit a data word, the SPC first applies a HIGH signal to enable odd-even lead 250 in FIG. 2. Also concurrently the SPC designates the class (i.e., odd, even) of word to be transmitted by applying a HIGH or LOW signal to odd/even lead 23 in FIG. 2. If lead 23 goes HIGH, an odd word is specified and if the lead goes LOW, an even word is specified. We will assume that an odd word is specified and therefore, gate 24 generates a HIGH output which sets odd-even flip-flop 25. The 1 output of flip-flop 25 goes HIGH supplying a HIGH level to gates 26 and 28 via lead 27. It is seen that this signal is inverted at gate 28, and gate 28 is disabled so that the odd data word cannot be gated into the even shift register ESR. Gate 26 is partially enabled to allow the odd data word to enter odd register OSR at a subsequent time.

The 0 output of checkback odd flip-flop CBO in memory CWM is HIGH supplying a HIGH level to the middle input of gate 26 via lead 29. At approximately 12 μs to 1 ms after the enable odd-even signal on lead 250, the SPC provides a HIGH level on word enable lead 200. AND gate 26 then generates a HIGH output which enables AND gates 201–225 to gate in a 25-bit data word from the SPC into shift register OSR. AND gate 226 generates a HIGH output which inputs a 1 into the odd-bit position of register OSR, which 1 indicates that the data word is odd. AND gate 227 continues to supply a LOW output to the start bit position in register OSR so that a 0 is stored in this position. As described later, this 0 indicates to remote receiver RR the start or first bit of a data word. The 1 in the odd bit position designates to the remote location that the data word is odd.

Thus, when the checkback-odd-flip-flop CBO in memory CWM is reset indicating the last odd word was acknowledged and the SPC specifies that an odd word is to be transmitted by applying a HIGH signal to odd-even lead 23 to set flip-flop 25, an odd data word is gated into odd shift register OSR by the HIGH signal applied to word enable lead 200. It should be noted that if the checkback-even-flip-flop CBE were reset, and an even word specified by the SPC, then the same data word would have been gated into the even shift register ESR.

The HIGH signal on word enable lead 200 also sets flip-flop WR, which provides a HIGH signal to AND gate 291 over the gate's lower input lead. The output of gate 291 goes HIGH to set start flip-flop 21 when the output of clock 1 is LOW, as described hereinafter. The function of this gate is to ensure that the data word is transmitted in synchronism with the clock to avoid transmitting the first bit of the data word for less than the usual duration. The 1 output of start flip-flop 21 goes HIGH. This HIGH output is conveyed to gate 41 via lead 235, where it is inverted. The output of gate 41 goes LOW causing the output of gate 42 to go LOW. As a result, modem A stops transmitting the continuous stream of 1s.

As described below, the data word in register OSR is now serially applied to modem A via gates 233 and 42. More specifically, the 0 in the start bit position of register OSR is applied to gate 233, which generates a LOW output because the start bit in register ESR is also a 0. The start bit in register ESR is always noninterfering when a word is being shifted out of register OSR. The output of gate 42 also goes LOW and modem A transmits a 0 beginning on the positive transition of clock 1 at time *t1* in FIG. 7. As described below, each of the modems is responsive to the HIGH or LOW state of its input lead at each positive transition of its clock for transmitting the appropriate bit until the next positive transition. Thus modem A transmits a 0 from *t1* to *t3.*

Figure 7:
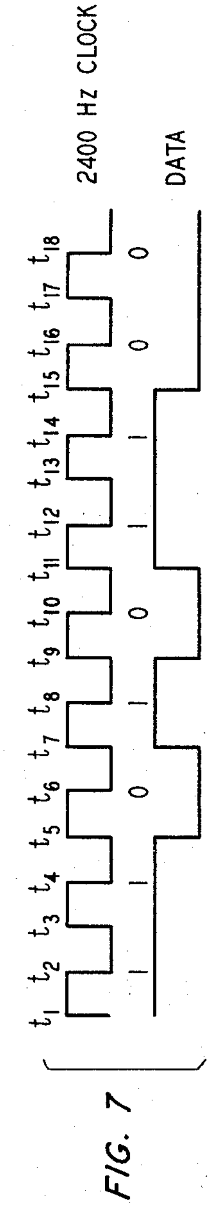
FIG. 7 illustrates the synchronization of clock signals and data signals in the remote receiver of FIG. 4 and also illustrates the clock waveform generated by each of the clocks 1–4 in FIGS. 2, 4, 5, and 3 respectively.

Start flip-flop 21 applies a HIGH signal to gate 228 and clock 1 applies a 2400-Hz square wave to gate 228. The shape of this square wave is depicted in FIG. 7. With reference to FIG. 7, it is seen that the output of clock 1 is HIGH during the time period from *t1* to *t2* and remains LOW from *t2* to *t3* and so on. During the time interval from *t1* to *t2* when clock 1 supplies a HIGH output, the output of AND gate 228 goes HIGH supplying a HIGH level to the inputs of gates 229 and 230. Gate 228 also applies a HIGH signal to shift register counter SRC1 which counts the number of bits which are shifted out of the odd or even registers. This counter is a shift register with 27 bit positions corresponding to the 27 bits in the data words. Initially the counter contains all 0s but as the bits are shifted out of the odd or even shift register OSR or ESR, a 1 is inserted in the left-hand side of the counter for each shifted bit. Thus, on the negative transition of the HIGH signal from gate 228 at time *t2* a single 1 is inserted into the left-hand bit position (i.e., position PC1) of the counter indicating that only the first bit of a data word is being shifted out as described hereinafter. Now lead PC1 is HIGH because a 1 has been inserted in position 1 in the counter, and lead PC2 remains LOW because position 2 contains a 0. Exclusive OR gate 236 now applies a HIGH output to gates 237 and 238. Because an odd word was specified as described previously, the 1 output of odd-even flip-flop is HIGH. Thus gate 237 applies a HIGH output to checkback-odd-flip-flop CBO in memory CWM to set the flip-flop to store an odd class indication thereby indicating that an odd word is being transmitted. Since an odd word is being transmitted as previously described, the 1 output of odd-even flip-flop 25 is supplying a HIGH level to the left-hand input of AND gate 229. This HIGH signal from flip-flop 25 is inverted at the left-hand input of gate 230 thereby inhibiting this gate from shifting out the contents of register ESR. Of course the start bit of register ESR is still applied to gate 233, but no other bits in register ESR are output. During the time interval from *t1* to *t2,* gate 229 supplies a HIGH level to register OSR responsive to the HIGH signal from gate 228. At time *t2* the output of gate 229 goes LOW and the negative transition causes the register to serially shift its entire contents 1-bit position to the right. Prior to the shift at time *t2* the 0 previously inserted in the start bit position of register OSR was applied as an output on lead 231 and transmitted as mentioned previously. At time *t2,* the 1 in the odd bit position is shifted into the start bit position. Also at time *t2,* the 0 output over lead 231 is reinserted in register OSR. As the word in odd shift register OSR is shifted out, each bit shifted out of the right side of the register is reinserted via lead 232 as the first bit in the left-hand side of the register. Thus as a data word is shifted out for transmission, it is reinserted back in the register for subsequent retransmission if necessary. The output over lead 231 is now HIGH because a 1 has been shifted into the start bit position. This HIGH output is applied via lead 231 to the lower input of OR gate 233. Since the start bit in the even shift register ESR is always a 0, the application of this bit over the upper input of gate 233 is always noninterfering. Thus gate 233 generates a HIGH output which is applied as the upper input of OR gate 42. OR gate 42 generates a HIGH output signal which is applied to modem A. At time *t3* this modem then transmits a 1 bit to modem B. This 1 is transmitted until the next positive transition at time *t5.* The reception of the transmitted data word by remote receiver RR will be described hereinafter.

The preceding described the manner by which an odd data word was loaded into shift register OSR and the start bit (first bit) of this data word was transmitted by modem A and reinserted in register OSR. A 1 was inserted in the first position of shift register counter SRC1 indicating that only one bit of the data word has been shifted out. Checkback-odd flip-flop CBO in class of word memory CWM was set to store an odd class indication to indicate that an odd data word was being transmitted.

To continue, during the time interval *t3–t4* shown in FIG. 7, gate 228 applies the second HIGH output signal to shift register counter SRC1 and gate 229. The signal applied to shift register counter SRC1 inserts a 1 at time *t4* in the first position PC1 and shifts the bits in each of the other positions into succeeding positions. Therefore, now positions PC1 and PC2 contain 1s and the remaining positions PC3–PC27 still contain 0s. Gate 229 also applies a HIGH signal to register OSR. On the negative transistion of this signal at *t4,* the contents of register OSR shift a second time. Now the present bit in the odd bit position is shifted into the start bit position and applied over lead 231. The 1 previously in the start bit position is reinserted in the register at time *t4* via lead 232. Now the output over lead 231 indicates the new bit in the start bit position. If this bit is a 1 the outputs of OR gate 233 and OR gate 42 go HIGH applying a 1 to modem A. The modem then transmits this bit starting at time *t5.* Thus, all shifting and reinsertion of bits in register OSR occur on negative transitions of the clock whereas new bits are transmitted beginning on positive clock transitions.

In a similar fashion for each of the succeeding clock pulses at *t6, t8,* . . . , etc. the remaining 25 bits in the odd shift register OSR are reinserted in the register and also applied to modem A via gates 233 and 42. When a 1 is shifted into the last position (i.e., PC27) of shift register counter SRC1 on a negative transition, the last bit in register OSR is already being transmitted by modem A as of the preceding positive transition, and lead PC27 goes HIGH resetting start flip-flop 21 and flip-flop WR. The 1 output of flip-flop 21 goes LOW inhibiting the further application of clock signals to register OSR and counter SRC1 by inhibiting gate 228. Concurrently therewith the 0 output of start flip-flop 21 goes HIGH clearing shift register counter SCR1 to its initial state of all 0s. As is well known in the art, the previously described structure such as the odd and even date registers, and shift register counter may be implemented as words in software. Moreover the control of these elements, in accordance with the above description, may also be implemented in software.

Figure 4:
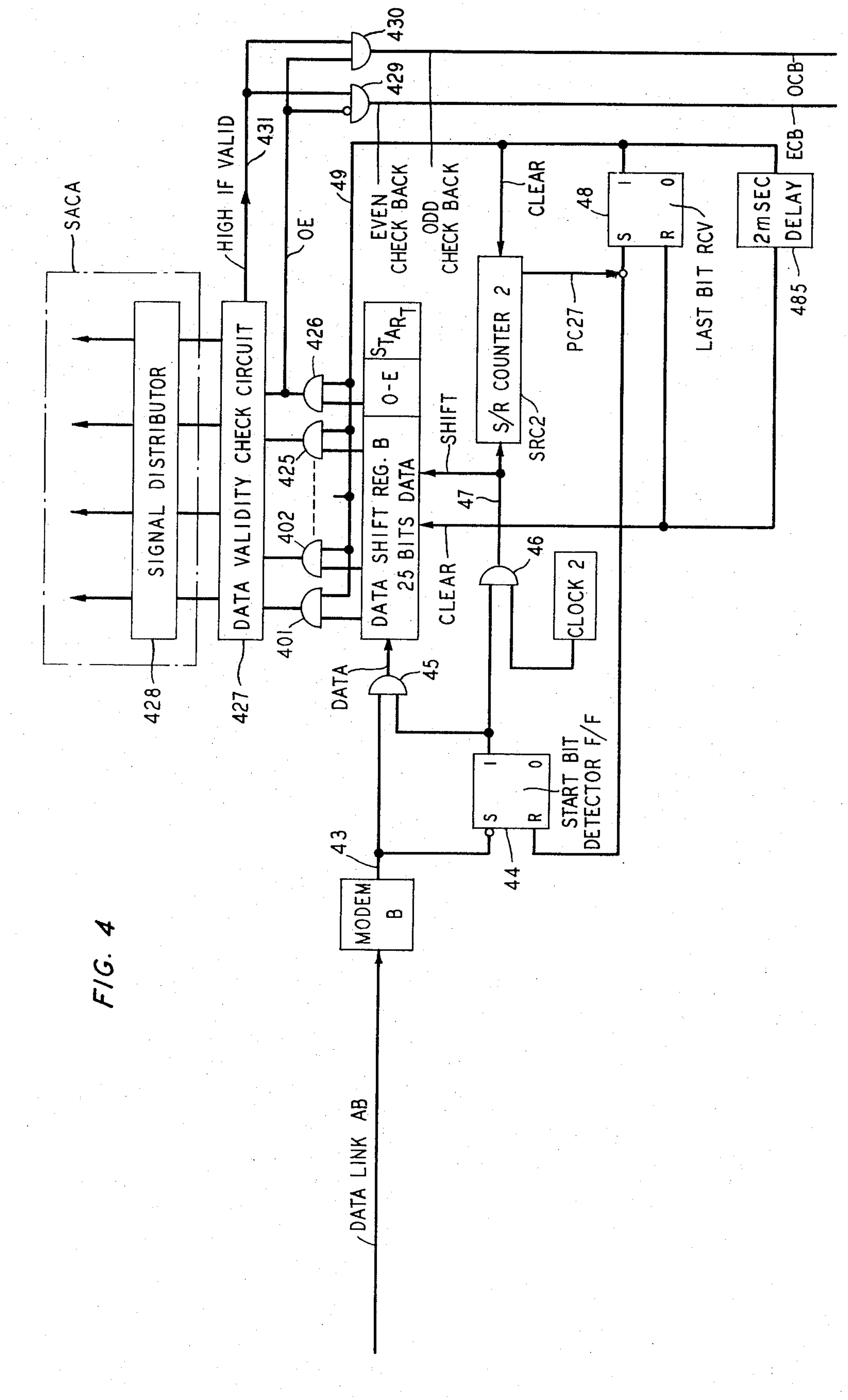

Turning now to FIG. 4, the reception of the transmitted odd data word will now be described in detail. When modem B receives the start or 0 bit, output lead 43 goes from a HIGH state to a LOW state. This LOW signal is inverted to set start-bit-detector flip-flop 44. The 1 output of this flip-flop goes HIGH to allow AND gate 45 to gate the incoming data word from modem B into data shift register B. This shift register has 27 bit positions and is essentially of the same format as registers OSR and ESR in FIG. 2 except that it can temporarily store either odd or even words. The output of gate 45 serially presents each of the bits of the odd data word to register B, but each bit is not inserted into the register until a shift pulse is applied to register B. Clock 2 also generates the 2400-Hz square wave shown in FIG. 7. After the start bit detector flip-flop is set, as previously discussed, the square clock wave is applied to register B via gate 46. Register B is designed to accept the data applied from gate 45 and to shift all the bits one position to the left only on the negative transitions of the clock wave, i.e., at *t2, t4, t6, t8,* etc. Shift registers adapted to shift only on negative transitions of a square wave are well known. Turning again to FIG. 7, we will assume that the leftmost 0 in the line entitled data which is present from *t5* to *t7* represents the start bit of the odd data word. This 0 is inserted in the first bit position of register B at time *t6.* Also at time *t6* a 1 is inserted in shift register counter SRC2 which serves to count the number of bits which are entered into register B. Initially this counter contained all 0s, but now position 1(PC1) contains a 1 indicating that only one bit of the data word has been received. This counter is identical in operation to counter 1 previously described in FIG. 2.

In a similar manner when the 1 bit representing the odd bit appears as a HIGH signal from gate 45 at time *t7–t9,* this 1 is gated into register B at *t8* and a second 1 is inserted in counter SRC2. Now only the first two positions in counter SRC2 contain 1s indicating that two bits have been received. Finally when each of the 27 bits from the register OSR is inserted in register B, lead PC27 of counter SRC2 goes HIGH because of 1 in the last position setting last bit received flip-flop 48 and resetting flip-flop 44 to inhibit the further insertion of data into register B. It should be noted at this time that when start flip-flop 21 in the local transmitter of FIG. 2 was reset after the last bit of the odd data word was transmitted, gate 41 again began applying a HIGH level signal to OR gate 42 causing modem A to again begin transmitting to modem B a continuous stream of 1s, which are not inserted in register B because gate 45 is inhibited by the reset state of flip-flop 44.

Returning to FIG. 4 when last-bit-received flip-flop 48 was set, its 1 output went HIGH clearing counter 2 and applying a gating signal via lead 49 to gates 401–426 to gate the data word to data validity check circuit 427. The start bit was not gated to this circuit because it does not contain any information, but is utilized merely to indicate the start of a new word. Circuit 427 comprises combinational logic which performs normal parity and validity checks over the data to ensure that a valid word has been received. If the word is valid, then it is applied to the signal distributor 428 of semiautonomous control apparatus SACA. The distributor decodes the word and generates the appropriate signals to perform a specified function such as controlling a concentrator switch. The odd-even bit is output by gate 426 and applied to gates 429 and 430. If the data word is valid, circuit 427 applies a HIGH signal to lead 431. Gate 430 rather than gate 429 is enabled since a 1 is in the odd-even bit position indicating that the data word was odd. If the data word was even, the odd-even bit would have been 0 and gate 429 would have generated a HIGH output over lead ECB. The HIGH output of gate 430 is applied over lead OCB to OR gate 51 in FIG. 5 which applies a start pulse to predetermined code and parity generator 52. When lead 514 is HIGH to indicate an odd checkback, generator 52 generates the code 10101 over leads 53–57 respectively, which code indicates that an odd data word was received. If lead 515 were HIGH to indicate an even checkback, the generator 52 would have generated the code 10100 over these leads to indicate an even data word was received.

After a 1 $\mu$s delay generated by delay 58, output lead 59 oges HIGH enabling gates 501–508 to gate an acknowledgment word into data shift register C. Gate 501 inserts a 0 into the start bit position and gate 502 inserts a 0 into the even bit position because the output of gate 429 was LOW. Gate 503 inserts a 1 into the odd bit position because the output of gate 430 was HIGH since an odd word was received. The bits 10101 are inserted respectively by gates 504–508.

Figures 5, 6:
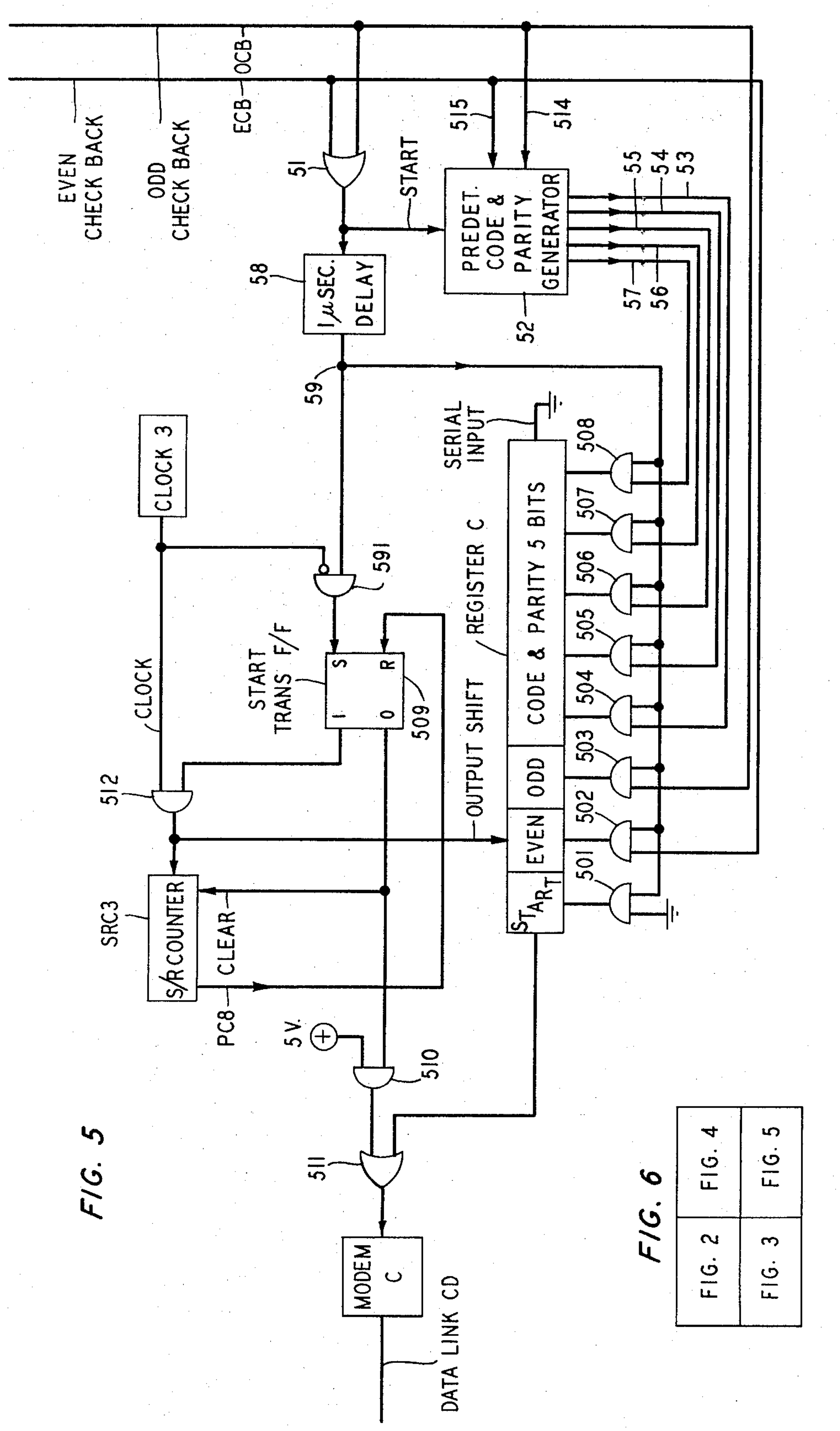
FIG. 6 illustrates the manner in which FIGS. 2–5 should be arranged.

The HIGH signal on lead 59 from delay 58 is also applied to gate 591 which sets start transmission flip-flop 509 when the output of clock 3 is LOW. The function of gate 591 is to synchronize transmission of the acknowledgment word with clock 3. Prior to such setting, the 0 output of flip-flop 509 was HIGH applying the HIGH level signal to the lower input of AND gate 510 which applied a continuous HIGH level signal to OR gate 511 so that modem C transmitted a continuous stream of binary 1s over data link CD to modem D. However when the flip-flop 509 is set, as described above, its 0 output goes LOW, causing the output of AND gate 510 also to go LOW stopping the transmission of the stream of 1s at the next positive clock transition. The lower input of gate 511 is LOW reflecting the 0 bit in the start bit position. On the next positive transition of clock 3 modem C begins to transmit this 0. The 1 output of flip-flop 509 goes HIGH enabling gate 512 to apply shift to register counter SRC3, the clock signals from clock 3. This clock signal is a square wave corresponding to the waveform shown in FIG. 7. It should be noted that although all clock signals from clocks 1–4 are identical in shape to that shown in FIG. 7, such clocks need to be perfectly synchronized. With reference to FIG. 5, the output of gate 512 goes HIGH during a time interval such as $t1$–$t2$ causing a 1 to be inserted in the rightmost bit position of counter SRC3 at time $t2$, and also causing register C to shift all the bits one position to the left at time $t2$ so that the even bit (0) is shifted to gate 511 for subsequent transmission by modem C beginning at $t3$ and ending at $t5$. At the next following time interval such as $t3$–$t4$, gate 512 again generates a HIGH output signal which inserts a second 1 into the counter SRC3 at time $t4$ and causes all the bits to shift another position at time $t4$ so that the 1 originally in the odd bit position is now shifted out to be transmitted beginning at $t5$. The grounded serial input to register C inserts a 0 in the rightmost bit of this register each time the register is shifted. Finally when counter SRC3 has eight 1s therein indicating the last bit in register C has been transmitted, lead PC8 goes HIGH to reset flip-flop 509. The 0 output of this flip-flop goes HIGH clearing counter SRC3 to an all 0 state and enabling gate 510 so that a continuous stream of 1s is again transmitted beginning the positive clock transition after lead PC8 went HIGH. This stream of 1s is transmitted only when no other real data is to be transmitted to the SPC.

If the actual environment in which my invention is utilized, requires other data words from the SACA to be conveyed to the SPC over data link CD, the acknowledgment words would be buffered by circuitry which is not shown. In this event, some of the delay in receiving acknowledgment words would be entailed in this buffering process in which acknowledgment words would wait to be transmitted.

Figure 3:
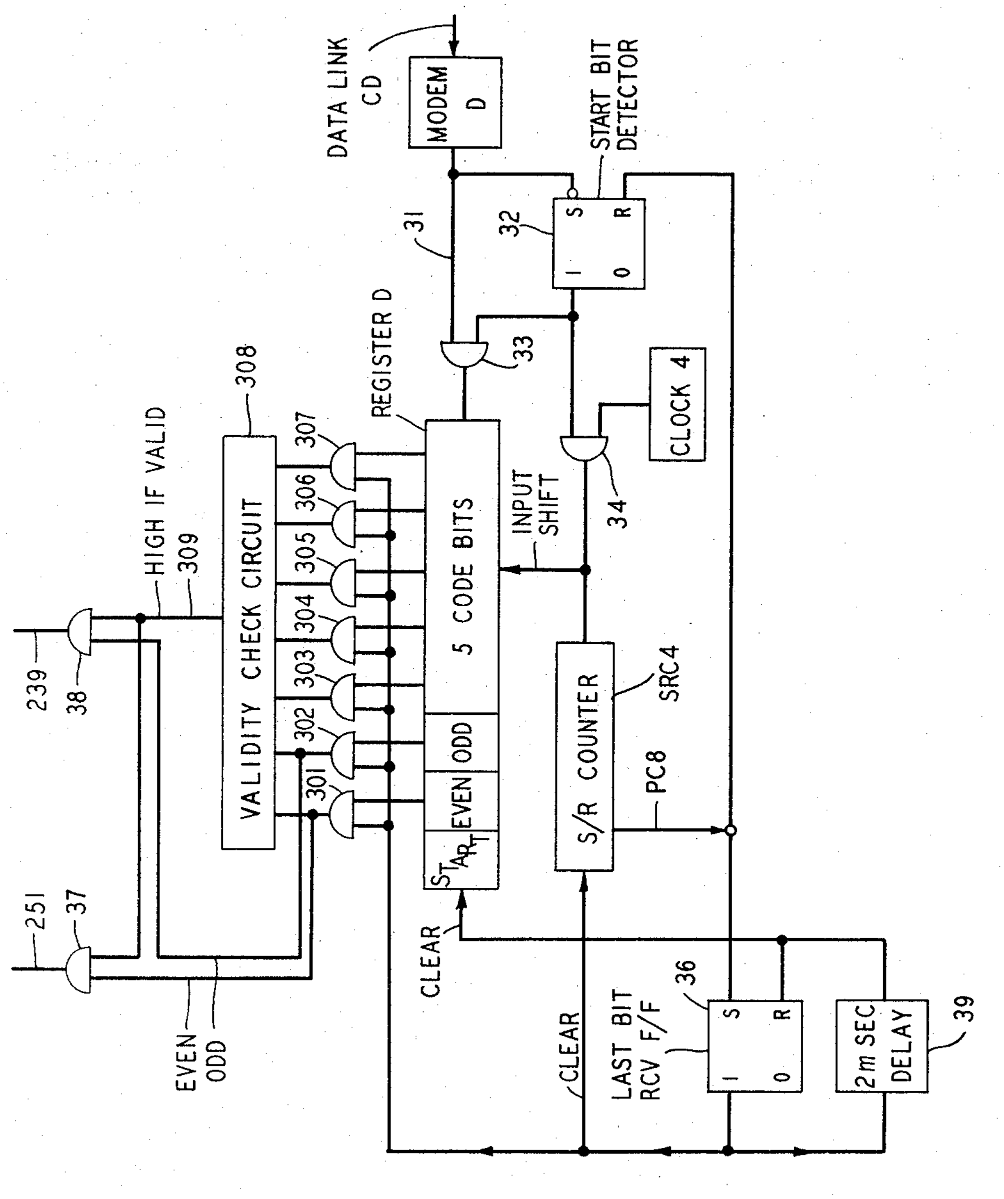

Turning now to FIG. 3, the reception of the odd acknowledgment word by local receiver LR will be described in detail. When modem D receives the 0 or start bit from modem C, lead 31 goes LOW setting start-bit-detector flip-flop 32. The 1 output of this flip-flop goes HIGH and the output of gate 33 remains LOW applying the 0 bit to data shift register D. The data output from gate 33 is not gated into the register D until the negative going edge or negative transition of the clock signal. This clock signal, which corresponds to the waveform shown in FIG. 7, is applied to gate 34 which was partially enabled when flip-flop 32 was set. On the negative going edge of each clock pulse, the data bit represented as the output of gate 33 is shifted into the register and a 1 is shifted into counter SRC4 which previously contained all 0s. In a similar manner for each of the successive seven clock pulses, each of the last seven bits of the odd acknowledgment word applied as the output of gate 33 is successively shifted into register D. At this time, counter SRC4 contains eight 1s and lead PC8 goes HIGH to reset start bit detector flip-flop 32 to inhibit the further shifting of data into register D. Moreover, the HIGH signal on lead PC8 sets last bit received flip-flop 36. The 1 output from this flip-flop enables gates 301–307 to apply the odd acknowledgment word stored in register D to validity check circuit 308. This circuit is similar to check circuit 427 previously described. If the word is valid, circuit 308 applies a HIGH signal to lead 309 to partially enable gates 37 and 38. Because this is an odd acknowledgment, the output of gate 301 is LOW, and the output of gate 302 is HIGH. Thus only gate 38 applies a HIGH signal over lead 239 to reset checkback-odd flip-flop CBO while the output of gate 37 remains LOW. As discussed previously, this flip-flop was set when the odd data word was transmitted and is now reset to indicate that an odd acknowledgment was received for this odd data word and the next odd word can be transmitted. The output of gate 38 is also applied via lead 239 to odd shift register OSR to clear the contents of this register. If register OSR is not cleared, the previously transmitted odd data word would be retransmitted because, as described previously, each of the bits in the register was reinserted in the register as the odd data word was applied to modem A.

Returning briefly to FIG. 3, when flip-flop 36 generated a HIGH signal at its output, this signal also enabled 2 ms delay 39 which after 2 ms applied a HIGH signal to reset flip-flop 36 and to clear register D to receive the next data word. Also, 2 ms delay 485 in FIG. 4 reset flip-flop 48 and cleared data register B 2 ms after being enabled when the output of flip-flop 48 went HIGH. Register B could then receive the next data word.

Thus, I have described in detail how an odd data word is first gated into the odd shift register and then applied to modem A for transmission to modem B. Checkback-odd flip-flop CBO was set to store an odd class indication in memory CWM to indicate an odd word was transmitted. Modem B applied the word to register B and an odd checkback signal was generated by gate 430 to indicate that an odd word had been received. This odd checkback signal caused the generation of an odd acknowledgment word which indicated that an odd data word had been received. This acknowledgment word was gated into register C and then serially applied to modem C for transmission to modem D. The acknowledgment word was then gated into register D and subsequently served to reset checkback-odd flip-flop CBO in memory CWM and clear odd shift register OSR.

In accordance with this illustrative embodiment of my invention, approximately 25 ms after the odd data word was transmitted, SPC designates that an even data word is to be transmitted by resetting odd-even flip-flop 25. A new data word is gated into register ESR and as the first bit of this even data word is applied to modem A for transmission, checkback even flip-flop CBE in memory CWM is set to indicate that an even word is being transmitted.

More specifically, the arrangement shown in FIG. 2 operates for the even data word exactly as it did for the odd data word with the following exceptions: odd/even lead 23 remains LOW causing odd-even flip-flop 25 to be reset by the output of gate 240. Since the 1 output of this flip-flop goes LOW, gate 26 is disabled while gate 28 is enabled to gate the data word into even shift register ESR. Moreover, when AND gate 228 applies the clock pulses to gates 229 and 230, only gate 230 is enabled by the output of flip-flop 25 to shift the contents of even shift register ESR to OR gate 233 for application to modem A. Then shift register counter SRC1 receives the first HIGH signal on lead 228, pulse count 1 lead PC1 goes HIGH, and lead PC2 remains LOW. Gate 238 generates a HIGH signal to set checkback even flip-flop CBE.

With reference, to FIG. 4, the even data word is received in shift register B in an identical manner to that in which the previously described odd data word was received. However, gate 429 generates a HIGH signal to indicate that an even word was received rather than gate 430 as previously described. With reference to FIG. 5, the apparatus operates exactly as previously described except a 1 is inserted by AND gate 502 in the even bit position and a 0 is inserted by gate 503 in the odd bit position. Moreover, generator 52 generates the code 10100 for insertion in register C. The even acknowledgment word is transmitted by modem C in a manner identical to that by which the odd acknowledgment word was transmitted.

With reference to FIG. 3, the even data word is inserted in register D in an identical manner to that in which the odd data word was inserted. However, now the output of gate 301 is HIGH and the output of gate 302 is LOW when the 1 output of flip-flop 36 goes HIGH. Gate 37 is enabled, resetting checkback-even flip-flop CBE and clearing the contents from the even shift register ESR via lead 251.

Prior to the transmission of the next odd word 25 ms after the transmission of the even word described above, it is assumed that the odd previously described acknowledgment word is received so that the checkback-odd flip-flop is reset allowing the new odd data word to be gated into register OSR under the control of gate 26. If flip-flop CBO was not reset, then the middle input of gate 26 would remain LOW inhibiting the new data word from the SPC from being gated into register OSR for subsequent transmission.

Additional logic in FIG. 2 which has not yet been described is adapted to indicate to the SPC whether the data word the SPC applied to the data registers was transmitted or whether a previously transmitted data word was retransmitted. The upper input to gate 242 indicates whether the last transmitted odd word was acknowledged, and the lower input indicates whether the next word is an odd word (because odd-even flip-flop 25 is set). If the next word to be transmitted is odd and the last odd word was not acknowledged (i.e., 0 output of flip-flop CBO is LOW), then gate 242 applies a HIGH signal to OR gate 244 which in turn applies a HIGH output to the SPC to indicate that the new data word gated from the SPC was not transmitted because, as discussed previously, gate 26 would be inhibited because the 0 output of flip-flop CBO is LOW.

The upper input to gate 243 indicates whether the next word is even and the lower input indicates whether the last transmitted even word was acknowledged. If the next word is even (i.e., 1 output of flip-flop 25 is LOW) and the last even word has not been acknowledged because checkback-even flip-flop CBE is set, then gate 243 generates a HIGH output which is conveyed to the SPC via gate 244. Again, this would indicate to the SPC that the new data word gated to the registers was not transmitted, and that the previously transmitted data word in register ESR was retransmitted.

Thus, in summary, even and odd data words are alternatively transmitted to a remote location, and each time a data word is transmitted the appropriate checkback-even or checkback-odd flip-flop is set to store the appropriate class indication in memory. Each acknowledgment from the remote location specifies whether an odd or even data word was received, and serves to reset the appropriate checkback-even or checkback-odd flip-flop to clear the appropriate class indication from memory. If a checkback flip-flop is still set when the transmission of another word of the class associated with the flip-flop is attempted, the transmission of that word is inhibited and a previously transmitted word of that class is retransmitted. Thus, this embodiment of my invention beneficially provides for the transmission of data words prior to the reception of acknowledgments for previously transmitted data words.

What is claimed is:

1. In a data communication system for transmitting a plurality of data words of a plurality of different classes in a sequence wherein consecutive data words are of different classes, each data word containing therein data plus a designation of the class to which that data word belongs, a transmission control arrangement comprising, transmitting means for transmitting said data words to a remote location, receiving means for receiving class acknowledgments from said remote location, each acknowledgment defining the class of a data word received at said remote location, memory means, storing means controlled by said transmitting means for storing, with respect to each transmitted data word, a class indication in said memory means specifying the class of said each transmitted data word, clearing means controlled by said receiving means for clearing from said memory means the class indication of the class defined by each received class acknowledgment, and inhibiting means controlled by said memory means for inhibiting transmission by said transmitting means of other data words of each class specified by a class indication stored in said memory means.

2. The transmission control arrangement according to claim 1 wherein said memory means comprises a plurality of bistable devices each associated with a different one of said classes, said storing means stores, with respect to said each transmitted data word, said class indication by placing into a first state the bistable device associated with the class of said each transmitted data word, and said clearing means, with respect to each received class acknowledgment, places into a second state the bistable device associated with the class defined by said each received class acknowledgment.

3. The transmission control arrangement according to claim 2 wherein said inhibiting means inhibits transmission of said other data words of each class having an associated bistable device in said first state.

4. The transmission control arrangement according to claim 1 further comprising second receiving means at said remote location for receiving said transmitted data words, means responsive to each received data word for generating a class acknowledgment containing therein the class designation of said each received data word, and second transmitting means for transmitting said generated class acknowledgments to said first-mentioned receiving means.

5. The transmission control arrangement according to claim 1 wherein data words are of two classes, and wherein data words of each of said two classes are alternately transmitted by said transmitting means.

6. The transmission control arrangement according to claim 5 wherein the normal time interval between the transmission of consecutive of said data words by said transmitting means is less than the time interval between the transmission of one of said consecutive data words by said transmitting means and the reception of said acknowledgment for said one consecutive data word by said receiving means.

7. For use with a data processor alternately providing data words of a first and a second class, each data word having at least one bit therein designating the class of said each data word, the transmission control system comprising, transmitting means for transmitting to a remote location said data words as provided by said data processor, first and second memory means, writing means for writing an indication in said first memory means each time said transmitting means transmits a data word of said first class and for writing an indication in said second memory means each time said transmitting means transmits a data word of said second class, clearing means responsive to an acknowledgment from said remote location specifying which class of word was received at said remote location for clearing said indication from said first memory means if said first class of word is specified and for clearing said indication from said second memory means if said second class of word is specified, first inhibiting means for inhibiting said transmitting means from transmitting other words of said first class while said indication is written in said first memory means, and second inhibiting means for inhibiting said transmitting means from transmitting other words of said second class while said indication is written in said second memory means.

8. The transmission control system according to claim 7 wherein said transmitting means includes two registers, one for temporarily storing each transmitted word of said first class and the other for temporarily storing each transmitted word of said second class, and said clearing means includes means for clearing said one register when said indication is cleared from said first memory means and for clearing said other register when said indication is cleared from said second memory means.

9. The transmission control system according to claim 8 further comprising gating means controlled by said data processor for gating data words into said registers for transmission by said transmitting means, and wherein said first inhibiting means prevents data words from being gated into said one register, and said second inhibiting means prevents data words from being gated into said other register.

10. The transmission control system according to claim 7 wherein said first memory means comprises a first flip-flop, said second memory means comprises a second flip-flop, said writing means writes said indication in said first memory means by placing said first flip-flop in one state and writes said indication in said second memory means by placing said second flip-flop in one state, and said clearing means places said first flip-flop in another state to clear said indication from said first memory means and places said second flip-flop in another state to clear said indication from said second memory means.

11. In combination, first transmitting means for alternately transmitting data words belonging to a first and second class, each data word containing therein a designation of the class to which said each data word belongs, a first and second flip-flop, means for setting said first flip-flop each time a data word belonging to said first class is transmitted, means for setting said second flip-flop each time a data word belonging to said second class is transmitted, first receiving and generating means for receiving said transmitted data words and for generating acknowledgment words each defining the class to which a received data word belongs, second transmitting means for transmitting said acknowledgment words, second receiving means for receiving said transmitted acknowledgment words, means responsive to said second receiving means for clearing said first flip-flop each time a received acknowledgment defines said first class, means responsive to said second receiving means for clearing said second flip-flop each time a received acknowledgment defines said second class, first means for inhibiting said first transmitting means from transmitting other data words belonging to said first class while said first flip-flop is set, and second means for inhibiting said first transmitting means from transmitting other data words belonging to said second class while said second flip-flop is set.

12. In combination, transmitting means for alternately transmitting data words of two classes, first and second flip-flops, means for setting said first flip-flop each time a data word of one class is transmitted, means for setting said second flip-flop each time a data word of the other class is transmitted, means for resetting said first flip-flop each time an acknowledgment is received indicating that a data word of said one class was received from said transmitting means, means for resetting said second flip-flop each time an acknowledgment is received indicating that a data word of said other class was received from said transmitting means, and logic means for inhibiting said transmitting means from transmitting a previously untransmitted data word of said first class while said first flip-flop is set and for inhibiting said transmitting means from transmitting a previously untransmitted data word of said second class while said second flip-flop is set.

* * * * *